(12) United States Patent
Asmus et al.

(10) Patent No.: US 11,243,157 B2
(45) Date of Patent: Feb. 8, 2022

(54) SOOT SENSOR AND METHOD FOR PRODUCING A SOOT SENSOR

(71) Applicant: Heraeus Nexensos GmbH, Kleinostheim (DE)

(72) Inventors: Tim Asmus, Allendorf-Winnen (DE); Stefan Dietmann, Alzenau (DE); Karlheinz Wienand, Aschaffenburg (DE); Christoph Nick, Gelnhausen (DE)

(73) Assignee: Heraeus Nexensos GmbH, Kleinostheim (DE)

( * ) Notice: Subject to any disclaimer, the term of this patent is extended or adjusted under 35 U.S.C. 154(b) by 170 days.

(21) Appl. No.: 16/472,530

(22) PCT Filed: Dec. 20, 2017

(86) PCT No.: PCT/EP2017/083701
§ 371 (c)(1),
(2) Date: Jun. 21, 2019

(87) PCT Pub. No.: WO2018/115054
PCT Pub. Date: Jun. 28, 2018

(65) Prior Publication Data
US 2019/0323942 A1    Oct. 24, 2019

(30) Foreign Application Priority Data
Dec. 22, 2016 (EP) .................................. 16206130

(51) Int. Cl.
*F02D 41/14* (2006.01)
*G01N 15/06* (2006.01)
*G01N 25/72* (2006.01)

(52) U.S. Cl.
CPC ..... *G01N 15/0656* (2013.01); *F02D 41/1466* (2013.01); *G01N 25/72* (2013.01)

(58) Field of Classification Search
CPC .............. G01N 15/0656; G01N 25/72; G01N 25/1467; F02D 41/1466; B23K 26/388;
(Continued)

(56) References Cited

U.S. PATENT DOCUMENTS 9,523,632 B2 * 12/2016 Nishijima .......... G01N 15/0606
9,696,249 B2    7/2017 Hedayat et al.
(Continued)

FOREIGN PATENT DOCUMENTS

CN    105074421    11/2015
CN    105849525    8/2016
(Continued)

OTHER PUBLICATIONS

International Preliminary Report and Written Opinion dated Mar. 27, 2018 in parallel application PCT/EP2017/083701.

*Primary Examiner* — Robert R Raevis
(74) *Attorney, Agent, or Firm* — Dicke, Billig & Czaja, PLLC

(57) ABSTRACT

One aspect relates to a soot sensor for detecting electrically conductive and/or polarizable particles, including a substrate, an electrode layer that is formed on the substrate and that includes at least two spatially separated electrodes that engage into each other. At least one cover layer is formed on the side of the electrode layer facing away from the substrate. Multiple openings are formed in the cover layer, the openings at least partially exposing a surface of one electrode of the at least two electrodes.

12 Claims, 3 Drawing Sheets

(58) Field of Classification Search
CPC .... B23K 26/38; B23K 26/384; B23K 26/386; G23K 26/382; F92D 41/1466
USPC ............ 73/28.01, 23.33, 61.61, 61.62, 61.71, 73/114.71, 865.5; 324/693, 696, 700; 408/701; 29/592.1, 595, 610.1, 620, 825, 29/829, 832, 846, 852
See application file for complete search history.

(56) References Cited

U.S. PATENT DOCUMENTS

| | | |
|---|---|---|
| 10,107,221 B2 | 10/2018 | Wienand et al. |
| 2005/0227373 A1 | 10/2005 | Flandre et al. |
| 2008/0047847 A1 | 2/2008 | Schmidt et al. |
| 2008/0190173 A1 | 8/2008 | Wienand et al. |
| 2010/0244625 A1* | 9/2010 | Fukano ............... H03H 9/059 310/313 B |
| 2011/0203348 A1 | 8/2011 | Hedayat et al. |
| 2011/0248363 A1* | 10/2011 | Fujii ..................... G01L 9/0005 257/415 |
| 2012/0085146 A1* | 4/2012 | Maeda ................. G01N 27/043 73/23.31 |
| 2012/0151992 A1* | 6/2012 | Harada ............... G01N 15/0656 73/23.33 |
| 2014/0070825 A1 | 3/2014 | Humbert et al. |
| 2014/0240616 A1* | 8/2014 | Huang ................. G06F 3/0448 349/12 |
| 2014/0245815 A1 | 9/2014 | Nishijima et al. |
| 2015/0168285 A1 | 6/2015 | Hedayat et al. |
| 2017/0307499 A1* | 10/2017 | Tiefenbach ........ G01N 15/0656 |
| 2017/0356868 A1 | 12/2017 | Asmus et al. |
| 2019/0128789 A1 | 5/2019 | Asmus et al. |

FOREIGN PATENT DOCUMENTS

| | | |
|---|---|---|
| JP | 2002-357579 | 12/2002 |
| JP | 2004-269295 | 9/2004 |
| JP | 2012-083210 | 4/2012 |

* cited by examiner

SOOT SENSOR AND METHOD FOR PRODUCING A SOOT SENSOR

CROSS REFERENCE TO RELATED APPLICATIONS

This Utility Patent Application claims priority under 35 U.S.C. § 371 to International Application Serial No. PCT/EP2017/083701, filed Dec. 20, 2017, which claims the benefit of EP Patent Application No. EP 16206130.3, filed Dec. 22, 2016; which are both incorporated herein by reference.

The invention relates to a sensor for detecting electrically conductive and/or polarizable particles, in particular a soot sensor, comprising a substrate, an electrode layer formed on the substrate with at least two spatially separated and intermeshing electrodes, wherein at least one covering layer is formed on the side of the electrode layer facing away from the substrate. Furthermore, the invention relates to a method for the production of a sensor in accordance with the invention, in particular a soot sensor.

Sensors, for example with comb-like electrode structures, are used in order to measure soot concentrations in an exhaust gas flow from internal combustion engines. An exemplary electrode structure or an exemplary sensor is described in WO 2006/111386 A1. The drop in the electrical resistance due to the increasing soot deposit is measured between the electrodes. The sensor can be regenerated when the soot deposits are too severe by constructing a heating element on or in the soot sensor.

In order to increase the sensitivity of the soot sensor, the intermeshing electrodes should have as small a distance separating them as possible. In WO 2014/135450 A1, a small separation of this type is produced by individualizing the platinum electrodes by laser ablation of the platinum layer which has been applied over the entire surface, and thus electrode separations of less than 50 μm can be produced in this manner.

Because the concentration of soot in the exhaust gas flow from internal combustion engines is reducing, increasing the sensitivity of the sensor further would be desirable, without at the same time system modifying the sensor size or the principle of sensor production used up to now.

The underlying objective of the invention is to provide a further developed sensor, in particular a soot sensor, which has a higher sensitivity. A further objective of the present invention is to provide a further developed method for the production of a sensor in accordance with the invention.

In accordance with the invention, in respect of the sensor this objective is achieved by the features of claim 1. In respect of the method for the production of a sensor, in particular a soot sensor, the objective is achieved by the features of claim 9.

The invention arises from the notion of providing a sensor for the detection of electrically conductive and/or polarizable particles, in particular a soot sensor, wherein the sensor comprises a substrate, an electrode layer formed on the substrate with at least two mutually spatially separated and intermeshing electrodes, wherein at least one covering layer is formed on the side of the electrode layer facing away from the substrate.

In accordance with the invention, a plurality of openings is provided in the covering layer, which expose at least a section of a surface of an electrode, in particular of the at least two electrodes. It has been shown that the sensitivity of the sensor is increased when the covering layer, which covers large portions of the sensors, in particular large portions of the electrode layer, is structurized in an appropriate manner, in particular laser-structurized.

The substrate is preferably produced from aluminium oxide (Al2O3) and/or zirconium oxide (ZrO2) and/or from zirconium oxide (ZrO2) with insulation and/or other oxide ceramics. In a preferred embodiment of the invention, the substrate has a thickness of 0.5-1.0 mm.

An electrode layer is provided on one side of the substrate. This electrode layer comprises at least two electrodes which are spatially separated from each other and intermeshing.

Electrodes of this type may be comb electrodes and/or intermeshing electrodes. The at least two electrodes do not touch each other. Moreover, electrode sections of a first electrode are disposed in recesses of electrode sections of the second electrode, but without coming into contact with each other. Preferably, at least one of the electrodes is produced from platinum. The thickness of the electrode layer is preferably 0.5-20.0 μm.

The covering layer may, for example, be formed from aluminium oxide (Al2O3) and/or silicon dioxide (SiO2) and/or glass. Preferably, the covering layer has a thickness of 0.5 μm-20.0 μm.

In accordance with the invention, a plurality of openings is provided in the covering layer which are preferably in the form of slots. The term "openings in the form of slots" should be understood to mean that their length is greater than the width.

It is possible for the openings in the form of slots to be configured so as to be parallel to each other. In particular, it is possible for the openings in the form of slots to have a uniform pattern. This means that a plurality of rows of openings in the form of slots are disposed one beside the other, wherein the rows preferably each have the same distances between them.

The slot width of the openings is preferably between 1.0 μm and 50.0 μm.

The electrodes preferably comprise a plurality of longitudinal finger sections. In this regard, the finger sections of the at least two electrodes are preferably disposed parallel to each other.

The longitudinal extent of the openings in the form of slots may be parallel and/or perpendicular in configuration to the longitudinal extent of the finger sections, wherein the longitudinal extents of all of the openings in the form of slots are preferably parallel to each other in configuration. In other words, in a preferred embodiment of the invention, the covering layer is configured in a manner such that all of the longitudinal extents of the openings in the form of slots are either parallel or perpendicular to the longitudinal extent of the finger sections.

Particularly preferably, the openings in the form of slots are introduced into the covering layer in a manner such that the longitudinal extents of the openings in the form of slots are configured so as to be perpendicular to the finger sections of the electrodes. In other words, the longitudinal extents of the openings in the form of slots are configured so as to be perpendicular to the longitudinal extent of the finger sections.

Preferably, sections of the covering layer remain between the openings in the form of slots.

When using a sensor in accordance with the invention, filaments, in particular soot filaments, i.e. successive rows of particles or soot particles, are formed between the at least two electrodes. Filaments or soot filaments of this type grow from a negatively polarized electrode to a positively polarized electrode, preferably in the direction in which the gas is flowing. Preferably, a sensor is disposed in a flow of gas in a manner such that the direction of the gas flow runs perpendicular to the longitudinal extent of the finger sections. The sections formed between the openings in the form of slots or the remaining sections of the covering layer mechanically stabilize the described soot filaments. This results in a preferential filament formation, and thus in an enhanced sensitivity.

The filaments, in particular the soot filaments, may be described as chains of concatenated particles, in particular as chains of concatenated soot particles.

The formation of filaments, in particular soot filaments between adjacent electrodes, in particular between adjacent comb electrodes, reduces the electrical resistance if the filament makes contact with both electrodes. The sensitivity of the sensor is determined by the formation of the (soot) filaments.

In the particular case of the particularly preferred embodiment in which the longitudinal extents of the openings in the form of slots are configured so as to be perpendicular to the longitudinal extent of the finger sections, soot filaments may be formed or may grow along the remaining sections of the covering layer on the direct path between the at least two electrodes.

The openings, in particular the openings in the form of slots, may expose at least a section of the side faces of the finger sections and/or at least a section of the upper side of the finger sections. In other words, the uncovered or exposed surface of at least one electrode is a section of the upper side and/or of the side face of the electrode.

The "side faces of the finger sections" should be understood to mean the faces of the electrode which are configured so as to be (essentially) perpendicular to the substrate or perpendicular to the covering layer. Preferably, the side faces are configured so as to be (essentially) parallel to each other. The "upper side of the finger section" should be understood to mean the side which faces in the direction of the covering layer. At least on an intermediate product of the sensor or in an intermediate stage of the production of the sensor, the upper sides of the finger sections are covered, preferably completely covered, with the covering layer.

In a further embodiment of the invention, the openings, in particular in the form of slots, may expose at least sections of the edge regions of the upper side of the finger sections. The "edge region of the upper side" should be understood to mean the region of the upper side which is joined to the side faces of the finger sections.

In a further embodiment of the invention, at least sections of the surfaces of the exposed electrode sections may be coated with glass fibres and/or with particles, in particular with aluminium oxide particles (Al2O3) and/or with silicon dioxide particles (SiO2).

In a further aspect, the invention concerns a method for the production of a sensor in accordance with the invention, in particular a soot sensor in accordance with the invention. The method in accordance with the invention is characterized by the following steps of the method:
 a) providing a substrate,
 b) forming an electrode layer with at least two spatially separated and intermeshing electrodes on the substrate,
 c) applying a covering layer to the electrode layer,
 d) introducing openings, in particular in the form of slots, into the covering layer using a laser in a manner such that at least a section of the surface of at least one electrode is exposed.

In step d), i.e. when introducing openings, in particular in the form of slots, an ultrashort pulse laser is used in particular. In particular, the ultrashort pulse laser is a picosecond or femtosecond laser. With an ultrashort pulse laser of this type, it is possible to introduce openings in the form of slots into the covering layer with line widths of 1.0 to 50.0 µm.

When forming an electrode layer, it is initially possible in step b) to firstly apply a planar electrode layer to the substrate and then to structurize the electrode layer. A planar electrode layer may, for example, be applied by using a deposition method such as, for example, screen printing and/or sputtering and/or thermal evaporation. The subsequent structurization of the electrode layer may, for example, be carried out using a laser, in particular using an ultrashort pulse laser. In particular, in order to produce small distances between the individual electrodes, in particular between the individual finger sections of the electrodes, advantageously, an ultrashort pulse laser is used.

Alternatively, it is possible to produce the electrode layer by means of screen printing. In particular, metal pastes may initially be applied using screen printing in order to form a subsequent electrode structure.

The covering layer, in particular a ceramic covering layer, may be applied using screen printing and/or thermal evaporation and/or using an ADM (Aerosol Deposition Method). In accordance with the invention, following application of the covering layer, openings, in particular openings in the form of slots, are introduced using an ultrashort pulse laser.

Particularly preferably, the covering layer with a plurality of openings, in particular openings in the form of slots, is a laser structurized covering layer.

A further, subordinate aspect of the invention concerns the use of a sensor in accordance with the invention for the detection of electrically conductive and/or polarizable particles, in particular for the detection of soot particles.

In particular, the invention concerns the use of a sensor in accordance with the invention in an exhaust gas system, in particular in an exhaust gas system, of an internal combustion engine.

The sensor in accordance with the invention is preferably disposed in the exhaust gas pipe in a manner such that the direction of gas flow is orientated perpendicular to the longitudinal extents of the finger sections of the electrodes. The (soot) filaments described above are in particular formed from a negatively polarized electrode in the direction of the positively polarized electrode in the direction of flow of the gas. The sections of the covering layer which are formed between the openings, in particular openings in the form of slots, mechanically stabilise the (soot) filaments. Because of this, the preferential (soot) filament formation occurs. This brings about an enhanced sensitivity of the sensor in accordance with the invention.

Particularly preferably, the sensor in accordance with the application in accordance with the invention or the disposition in the exhaust gas pipe is configured in a manner such that the longitudinal extents of the openings in the form of slots are perpendicular in configuration to the longitudinal extent of the finger sections. In a configuration of the openings in the form of slots of this type, the (soot) filaments can grow along the remaining covering layer sections in a path which is directly between the at least two electrodes. The remaining covering layer sections may also be described as aluminium oxide (Al2O3) bridges if the covering layer consists of aluminium oxide.

The (soot) filaments described preferably form along the edges and/or comb-like bridges of the exposed covering layer. Furthermore, the (soot) filaments are formed in the "lee" or in the dead zone of the flow of local peaks on the topology of the covering layer.

The invention will now be described with the aid of exemplary embodiments with the aid of the accompanying diagrammatic drawings.

In the drawings:

FIGS. 1a-6b show various stages and steps of the method for the production of a sensor in accordance with the invention, wherein the steps of the method in accordance with FIGS. 6a and 6b represent alternatives to the steps 5a and 5b of the method;

In the following, identical parts and identically acting parts use identical reference numerals.

In FIGS. 1a-6b, the views of the sensor in accordance with the invention using the letter "a" show the respective steps of the method in a top view. The views using the letter "b" show cross sections through the sensor in accordance with the respective stage or step of the method. It should be noted here that the cross sectional views are not to scale, but rather, that the applied layers are shown greatly enlarged in the direction of the perpendicular to the surface of the substrate.

Figure 1A:
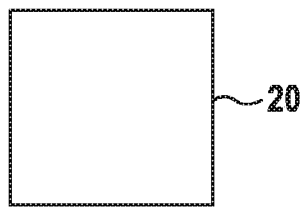
Figure 1B:
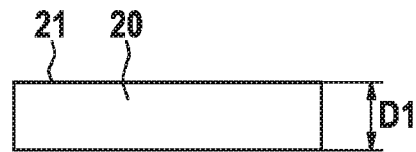

Firstly, the substrate 20 is shown in FIG. 1a. The substrate 20 may be produced from aluminium oxide (Al2O3) and/or zirconium oxide (ZrO2) and/or from zirconium oxide (ZrO2) with an insulation. The thickness D1 which can be seen in FIG. 1b may be 0.5-1.0 mm.

Figure 2A:
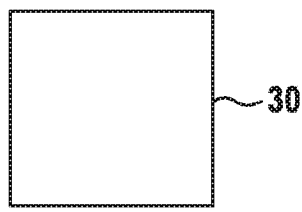
Figure 2B:
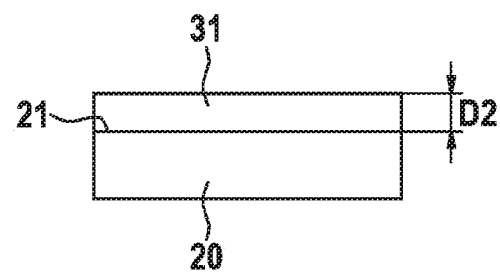

In the step of the method shown in FIGS. 2a and 2b, firstly, a planar electrode layer 30 is applied to the side 21 of the substrate 20. Preferably, the electrode layer 30 is a layer of platinum. This layer may be applied in the context of a screen printing method and/or as a result of a sputtering method and/or by means of a chemical evaporation method. The thickness D2 of the electrode layer 30 may be 0.5-20.0 µm.

Figure 3A:
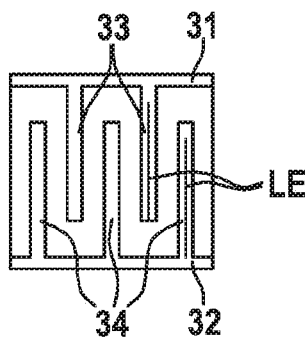
Figure 3B:
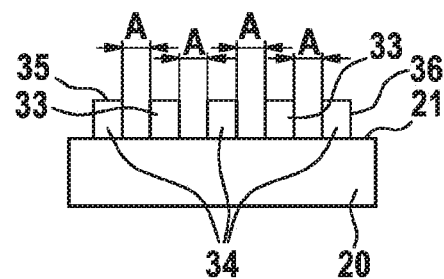

FIGS. 3a and 3b show the structurization of the electrode layer 30. In this regard, two electrodes, namely a first electrode 31 and a second electrode 32, are produced by means of laser ablation. The two electrodes 31 and 32 are formed by removing individual sections of the previously planar electrode layer 30.

The first electrode 31 comprises two finger sections 33. The second electrode 32 comprises three finger sections 34. The two electrodes 31 and 32 intermesh. In this regard, the finger sections 33 and 34 of the electrodes 31 and 32 do not come into contact. The finger sections 33 and 34 of the two electrodes 31 and 32 are essentially parallel to one another in configuration. Preferably, separations of 1.0-50.0 µm are formed between the finger sections 33 and 34. In particular, the separations A between the finger sections 33 and 34 are the same size. The electrodes 31 and 32 may also be described as interdigitated electrodes.

Furthermore, the longitudinal extents LE of the finger sections 33 and 34 can be seen; they are parallel to each other in configuration.

Figure 4A:
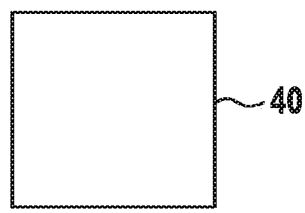
Figure 4B:
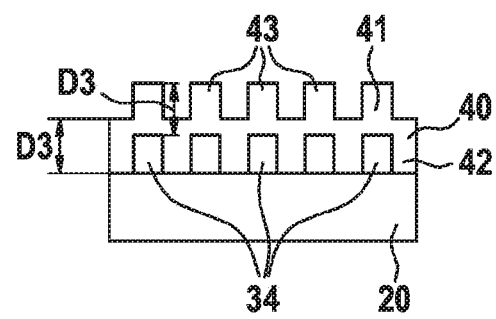

As can be seen in FIGS. 4a and 4b, a covering layer 40 is then applied to the electrode layer 30. The covering layer 40 may consist of aluminium oxide (Al2O3) and/or silicon dioxide (SiO2) and/or glass. The covering layer 40 is applied, for example, by means of a screen printing method or by means of a thermal evaporation or in the context of an ADM (Aerosol Deposition Method).

The covering layer 40 is applied to the electrode layer 30 in a manner such that both the upper sides 35 of the electrodes 31 and 32 and also the side faces 36 of the electrodes 31 and 32 (see FIGS. 3a and 3b in this regard) are covered by the covering layer. In this regard, the covering layer 40 may consist of a plurality of sections disposed one above the other. Namely, formed by a first section 41 and a second section 42. The two sections 41 and 42 are formed in a manner such that a uniform thickness D3 of the covering layer 40 is applied. In this regard, the thickness of the section 42 which is applied to the side 21 of the substrate 20 is identical to the thickness D3 of the first section 41 which is applied to the upper side 35 of the electrodes 31 and 32. The thickness D3 of the covering layer 40 is preferably 0.5-20.0 µm. Because of the consistent uniform layer thickness D3, protrusions 43 are formed in the covering layer 40.

Figure 5A:
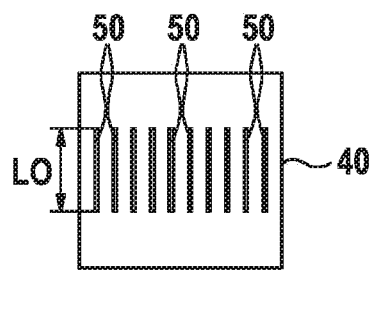

FIG. 5a shows the step d) in accordance with the invention. Here, openings in the form of slots 50 are introduced into the covering layer 40. The openings 50 are introduced into the covering layer 40 by means of an ultrashort pulse laser. In the exemplary embodiment shown in FIGS. 5a and 5b, the openings in the form of slots 50 are introduced into the covering layer 40 in a manner such that the longitudinal extents LO of the openings in the form of slots 50 are parallel in configuration to the longitudinal extents LE of the electrodes 31 and 32 (see FIGS. 3a and 3b). The openings in the form of slots 50 are parallel in configuration to each other. At least sections of the upper sides 35 of the electrodes 31 and 32 are exposed by the openings in the form of slots 50. In particular, the edge regions 39 of the upper sides 35 are exposed. The edge region 39 is constituted by the sections of the upper side 35 which border the side faces 36 of the electrodes 31 and 32. By introducing the openings in the form of slots 50, the widths of the protrusions 43 and/or the sections of the covering layer 42 between the electrodes 31 and 32 are reduced.

Figure 6A:
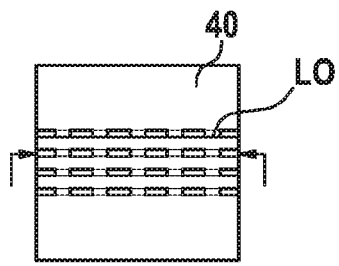
Figure 6B:
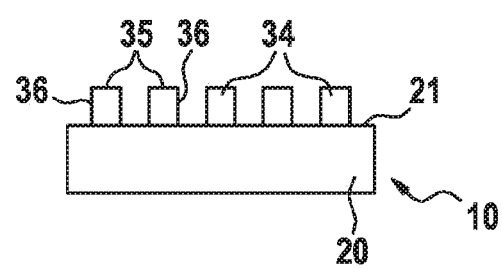

FIGS. 6a and 6b show a further embodiment of the invention. In this case, the longitudinal extents LO run perpendicular to the longitudinal extents LE of the electrodes 31 and 32. Preferably, the openings in the form of slots 50 are consistent in configuration. FIG. 6 shows a cross section along the arrow indicated in FIG. 6a. The openings in the form of slots 50 thus not only expose the upper sides 36 of the electrodes 31 and 32, but also the sides 21 of the substrate 20. Thus, in FIG. 6b, not only the upper sides 35 of the electrodes 31 and 32, but also the side faces 36 of the electrodes 31 and 32 are exposed.

Figure 5B:
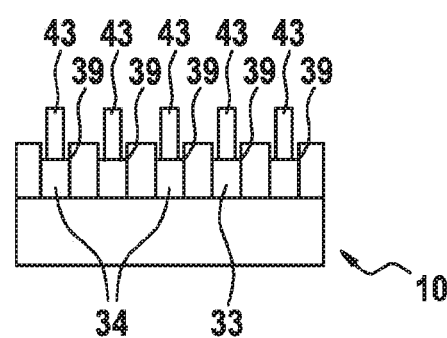
Figure 7:
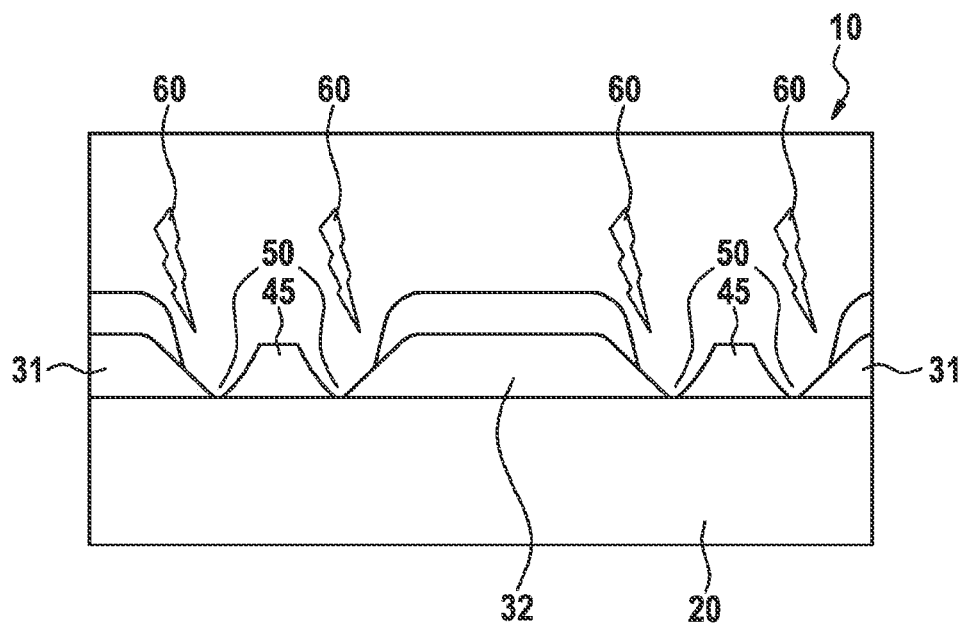
FIG. 7 shows a sensor in accordance with the invention in cross section.

FIG. 7 shows a further embodiment of the invention, which is similar to that in FIG. 5b. The enlarged cross section through a sensor in accordance with the invention shows that between the electrodes 31 and 32, sections 42 of the covering layer 40 can remain despite forming openings in the form of slots 50 which in the example shown are introduced by means of ultrashort pulse laser 60. In contrast to the embodiment shown in FIG. 5b, here, the side faces of the electrodes 31 and 32 and the side faces of the remaining structures 42 and 43 of the covering layer are not perpendicular in configuration, but are inclined to the surface of the substrate 20. The edges of the electrodes 31 and 32 and the edges of the remaining structures 42 and 43 of the covering layer are rounded.

Figure 8:
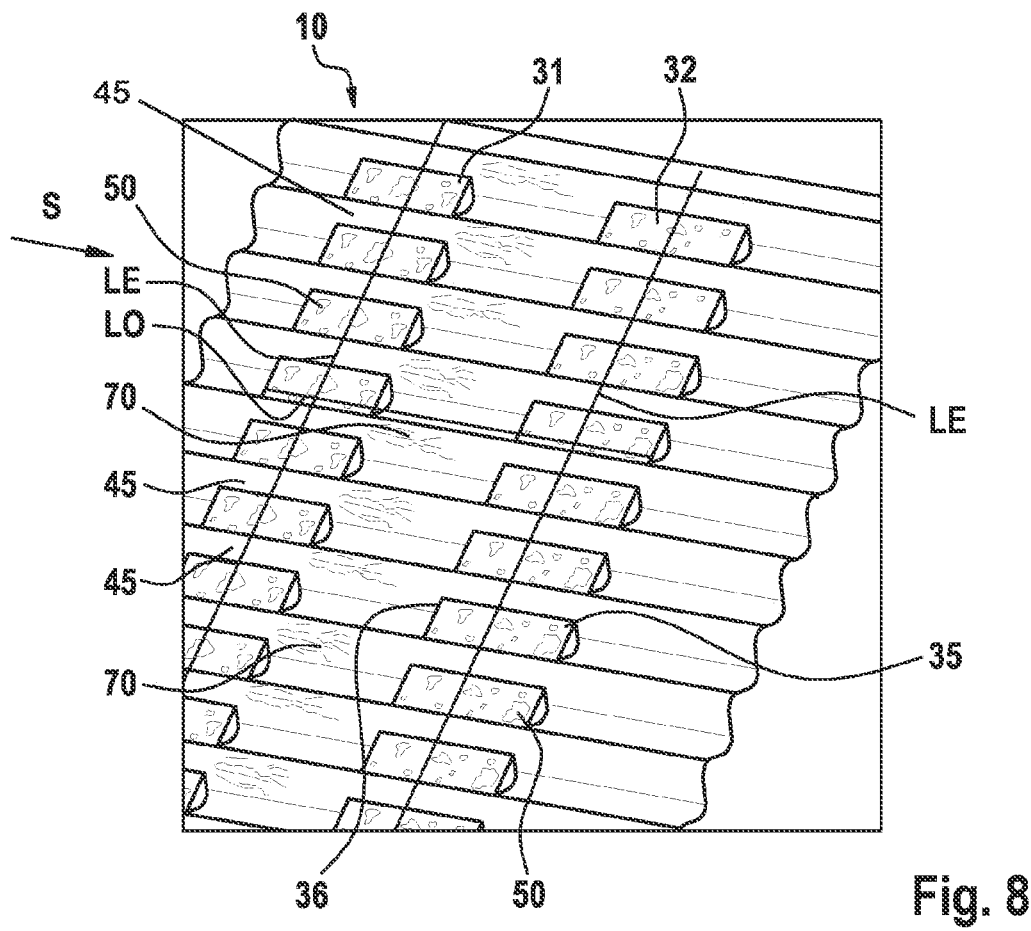
FIG. 8 shows a sensor in accordance with the invention in use.

A sensor 10 in accordance with the invention is also shown in FIG. 8. The direction of flow of gas S can be seen. In accordance with the invention, the sensor 10 is disposed in the flow of gas or in relation to the direction of flow of gas S in a manner such that the longitudinal extents LE of the electrodes 31 and 32 are perpendicular in orientation to the direction of flow S. The first electrode 31 in the example shown is negatively polarized, whereas the second electrode 32 is positively polarized.

The openings in the form of slots 50 can also be seen; their longitudinal extents LO are configured so as to be perpendicular to the longitudinal extent LE. Because of the openings in the form of slots 50, the upper sides 35 of the electrodes 31 and 32 as well as the side faces 36 of the electrodes 31 and 32 are exposed. In the example shown, the openings in the form of slots 50 are consistent in configuration. Sections 45 of the covering layer 40 are formed between the openings in the form of slots 50. These sections 45 form comb-like prominences. Filaments 70 are particularly preferentially formed along them on the sensor 10. The stationary comb-like prominences of the covering layer 45 can act to mechanically stabilise the filaments 70 as they are formed.

The filaments 70 are considered to be chains of concatenated particles, in particular chains of concatenated soot particles. The laser structurized covering layer 40 in accordance with the invention promotes the formation of filaments 70 of the soot particles which are formed between the electrodes 31 and 32. The electrodes 31 and 32 may thus be bridged together directly in a straight line by means of the sections 45. The sensitivity of the sensor in accordance with the invention is considerably increased compared with known sensors.

LIST OF REFERENCE NUMERALS

10 sensor
20 substrate
21 side
30 electrode layer
31 first electrode
32 second electrode
33 finger section of first electrode
34 finger section of second electrode
35 upper side of electrode
36 side face of electrode
39 edge region of upper side
40 covering layer
41 section of covering layer
42 section of covering layer
43 protrusion
45 section of covering layer
50 openings in the form of slot
60 ultrashort pulse laser
70 filament
A separation of finger section
D1 thickness of substrate
D2 thickness of electrode
D3 thickness of covering layer
LE longitudinal extent of electrode
LO longitudinal extent of opening
S direction of flow of gas

The invention claimed is:

1. A soot sensor for detecting electrically conductive and/or polarizable particles comprising:
    a substrate having a surface;
    at least two spatially separated and intermeshing electrodes formed on the surface of the substrate;
    at least one covering layer formed directly on upper surfaces of the at least two spatially separated and intermeshing electrodes, the upper surfaces facing a same direction as the surface of the substrate; and
    a plurality of openings provided in the covering layer that expose at least a section of a surface of an electrode of the at least two electrodes, the substrate, electrodes, covering layer and openings forming the soot sensor;
    wherein the at least two electrodes respectively comprise a plurality of longitudinal finger sections;
    wherein the plurality of openings are configured as slots and expose at least a section of an upper side of the finger sections; and
    wherein a longitudinal extent of the openings configured as slots are perpendicular to a longitudinal extend of the finger sections.

2. The sensor of claim 1, wherein the openings are configured in the shape of slots, and wherein the slot width of the openings is between 1.0 µm and 50.0 µm.

3. The sensor of claim 1, wherein the longitudinal extents of all of the openings in the form of slots are parallel to each other in configuration.

4. The sensor of claim 1, wherein the openings expose at least a section of the side faces of the finger sections.

5. The sensor of claim 4, wherein the openings expose at least sections of the edge regions of the upper side of the finger sections.

6. The sensor of claim 1, wherein at least sections of the surfaces of the exposed electrode sections are coated with at least one of glass fibres, particles, $Al_2O_3$ particles and/or $SiO2$ particles.

7. The sensor of claim 1, wherein at least one electrode comprises platinum.

8. A method of producing a soot sensor for detecting particles, the method comprising:
    providing a substrate;
    forming an electrode layer on a surface of the substrate;
    forming at least two spatially separated and intermeshing electrodes from the electrode layer;
    applying a covering layer directly to upper surfaces of the at least two spatially separated and intermeshing electrodes, the upper surfaces facing a same direction as the surface of the substrate; and
    introducing openings in the form of slots into the covering layer using a laser in a manner such that at least a section of the surface of at least one electrode is exposed and thereby forming the soot sensor;
    wherein the at least two electrodes respectively comprise a plurality of longitudinal finger sections;
    wherein the plurality of openings configured as slots expose at least a section of an upper side of the finger sections; and
    wherein a longitudinal extent of the openings configured as slots are perpendicular to a longitudinal extend of the finger sections.

9. The method of claim 8 further comprising using an ultrashort pulse laser to introduce openings in the covering layer.

10. The method of claim 8, wherein forming the at least two spatially separated and intermeshing electrodes from the electrode layer is carried out using an ultrashort pulse laser.

11. The method of claim 8, wherein forming the electrode layer comprises screen printing the electrode layer.

12. The method of claim 8, wherein applying the covering layer comprises use of at least one of screen printing, thermal evaporation, and ADM (Aerosol Deposition Method).

* * * * *